May 5, 1931. N. H. RICKER 1,803,405
ELECTROMAGNETIC METHOD OF UNDERGROUND EXPLORATION
Filed Jan. 27, 1928 3 Sheets-Sheet 1

Norman H. Ricker Inventor
By Jesse R. Stone
Attorney

May 5, 1931.　　　　N. H. RICKER　　　　1,803,405
ELECTROMAGNETIC METHOD OF UNDERGROUND EXPLORATION
Filed Jan. 27, 1928　　3 Sheets-Sheet 3

Norman H. Ricker Inventor

By Jesse R. Stone

Attorney

Patented May 5, 1931

1,803,405

UNITED STATES PATENT OFFICE

NORMAN H. RICKER, OF HOUSTON, TEXAS, ASSIGNOR TO J. P. SCRANTON, OF HOUSTON, TEXAS, TRUSTEE

ELECTROMAGNETIC METHOD OF UNDERGROUND EXPLORATION

Application filed January 27, 1928. Serial No. 249,802.

My invention relates to improvements in electro-magnetic methods of exploring for mineral deposits of petroleum, asphalt, coal, natural gas, salt, certain sulphide minerals, metallic ore bodies, and any masses buried beneath the earth's surface whose electrical constants are considerably different from the electrical constants of the surrounding earth.

This invention makes use of the passage of alternating electrical currents through the ground but operates on novel principles. Prior efforts along this line have included the study of the electro-magnetic field at the surface of the earth due to alternating electric currents passed or induced into the earth, but have recognized and attempted to detect and determine only a single electro-magnetic field or line of magnetic flux; or else having recognized the true elliptical nature of the field, have made observations only on the major axis or principal direction of this vibration ellipse; studying the variation in azimuth and dip of this field due to the presence of buried masses; making observations on the field by means of a loop consisting of numerous turns of wire and a vacuum tube amplifier for amplifying the small currents induced in the loop, and telephone receivers for listening to the resultant sound. In the course of extensive experiments on the passage of alternating electric currents through the ground and observations on the electro-magnetic field due to these currents, I have sought to overcome difficulties attending these older methods.

I find that the elementary treatment considering variations in azimuth and dip of a single electro-magnetic field or of the major axis or principal direction of the elliptical field due to currents in the earth as distorted by the presence of buried masses is not capable of revealing deposits of petroleum due probably to the difficulty of determining this direction accurately, and also due to the fact that the plane of the vibration ellipse at each point has not been fully ascertained.

Referring to the drawings, herewith, Fig. 1 is a schematic plan view illustrating the lines of flow of the current flowing between the two electrodes.

Figure 2:
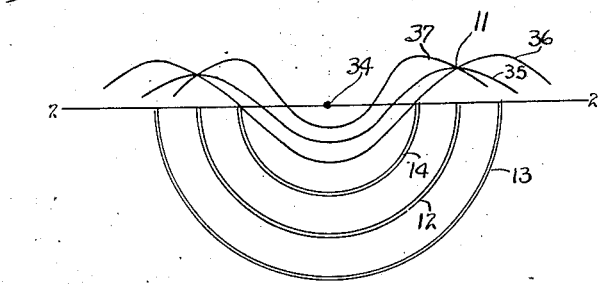
Fig. 2 is a cross section of the earth's surface on a midline 2—2 between the two electrodes and indicating the current sheets with their fields of magnetic force.
Figure 1:
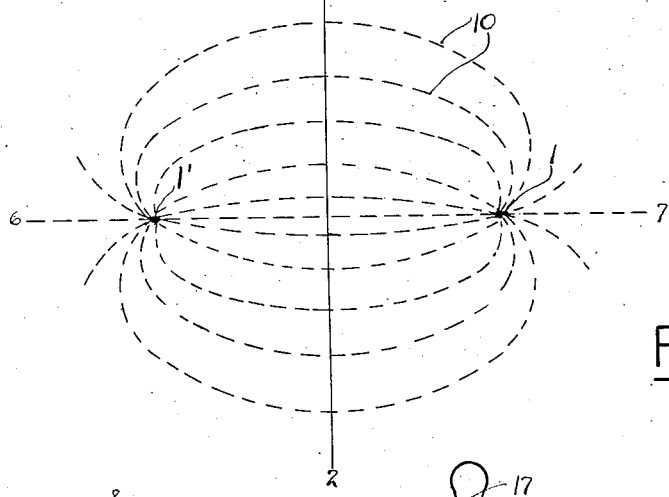

I have found experimentally that the electro-magnetic field at any point on the surface of the ground does not consist of a single field, or a single line of magnetic flux, but of many fields, such fields having different directions and phase relations with one another. This is best understood by reference to Figs. 1 and 2. In Fig. 1, 1, 1' refer to electrodes buried in the ground, permitting contact with the earth whereby an electric current is passed through the ground from an alternating current generator. The dotted lines 10 show approximately the paths taken by the current in passing through the ground. The lines shown in Fig. 1 represent the flow of current in the surface of the ground. However, the current flows through the deep mass of the earth in a similar manner, and if the frequency of the electric current is not too high, a fair approximation of the flow of the current through the earth may be obtained by causing these lines of flow, referred to above, to be rotated about the line 6—7 as an axis, thereby describing a series of surfaces. Thus, the current flow through the earth itself flows along curved current sheets and returns by way of the cable 34, and we can consider the flow as being made up of a large number of such elementary current sheets, each current sheet being defined by the portion of earth included between two surfaces a short distance apart, which surfaces are so defined that the electric current is at all points parallel with these surfaces, and these surfaces so chosen that the elementary linear currents making up the current sheet are all in phase with one another. In Fig. 2 I have shown a cross section of the earth and have represented at 12, 13 and 14 three of the current sheets. It is understood that there are an infinite number of these sheets and I merely show these to illustrate the nature of the current flow in the earth.

Let us consider a single such current sheet 12. The flow of current in this sheet will produce a magnetic field 35, which can be observed at the surface of the ground. This magnetic field will have a certain direction in space and will bear a certain phase relation with the electro-motive force between the electrodes 1, 1', depending upon the inductance of this current sheet. An adjacent current sheet 13 similarly will produce a magnetic field 36 at the surface of the ground, but the magnetic field due to this sheet will have a different direction and phase from that due to the first sheet 12, because the inductance of the second current sheet 13 will be different from the inductance of the first. A third such current sheet 14 will produce a magnetic field 37 at the point 11 in Fig. 2 in still a different direction and with a different phase angle. In Fig. 2 I have shown a single line as at 35 as representative of the magnetic field of the current sheet 12. The field of this current sheet 12, however, consists of innumerable lines substantially parallel with this line 35 and converging toward each other as they approach the vicinity of the cable 34 and diverging from each other as their distance from the cable increases. The total current flow in the earth is the sum of all these elementary current sheets into which the earth has been divided. As a result the electro-magnetic field at the surface of the ground will consist of an infinite number of elementary fields having different directions and phase relations with one another. Due to the fact that each current sheet has a different linear magnitude, the phase of each corresponding elementary magnetic field produced varies from that of each of the other magnetic fields so produced, and as each is in a different place the direction of each of the corresponding magnetic fields is different so that as a result of this both phase and direction of these fields are different, they cannot be combined into a single resultant field having a single direction and phase angle, and therefore any electro-magnetic method of prospecting based upon the assumption that a single electro-magnetic field exists which can be determined by azimuth and dip angles of a single line of magnetic flux is not in accord with observations. In integrating these elementary magnetic fields they should be resolved into components along two mutually perpendicular directions lying in the plane of the elementary fields. When this has been done, the components may be added separately and the result is a field with two components at right angles to one another and with a phase displacement between these components. In other words, the magnetic field is an elliptical vibration due to the plurality of out of phase current sheets instead of a linear one as would be obtained if a direct current were applied to the earth, the eccentricity of the ellipse depending upon the phase displacement and magnitudes of the components.

Some prior experimenters have attempted electro-magnetic methods of prospecting based upon the false assumption that there exists at any point a single electro-magnetic field, whereby two positions in space of a loop of wire are determined, in each of which positions no current will be induced in the loop. The intersection of the two planes defined by these two positions of the loop supposedly define the direction in space of the magnetic field.

As shown in the above theoretical discussion, no such two positions of the loop can be found in which no current is induced into the loop, this is due to the fact that the magnetic vibration does not take place along a line but in an elliptical manner and this result is in accord with experiments made under actual field conditions. Some other experimenters have recognized the elliptical nature of the magnetic field but have determined only the direction of the major axis of this vibration ellipse. In general, however, by proper manipulation a single angular position of the loop can be found at which no current is induced into the loop showing that in general, elementary magnetic fields due to the various current sheets all lie in a surface such that when no current is induced into the loop the plane of the loop is tangent to the surface containing the elementary magnetic fields. If the loop is rotated about both vertical and horizontal directions until the tone vanishes the plane of the loop must then correspond to the plane of vibration of the elliptically polarized field. If a series of observations are made at a series of points adjacent to one another there will be at each of these points a plane of the vibration ellipse and this family of planes has an envelope which is the surface of magnetic fields to which I have reference in this application.

An electro-magnetic method of exploring the earth's sub-surface must, therefore, consist in determining distortions in this surface of magnetic fields.

My invention, therefore, has for its object the causing of alternating electric currents to flow in the ground between two electrodes embedded in the surface thereof and in making observations over the surface of the ground with apparatus in general, and with a loop, vacuum tube amplifier, and telephone receivers in particular; to detect distortions in the surfaces containing the magnetic fields due to these currents. In so doing, I take cognizance of the fact not heretofore utilized that the magnetic field at a point in space due to currents passed through the earth is not limited to a single direction in space but to a surface to which all the elementary magnetic fields at a given point due to the elementary current sheets in the earth itself are tangent.

Figure 3:
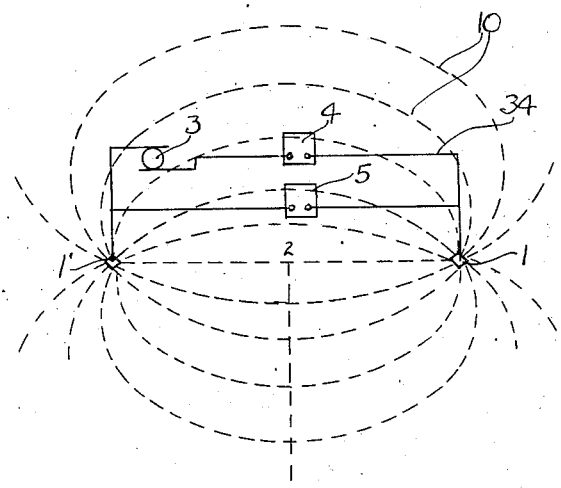
Fig. 3 is a schematic view of the set-up of the electric circuit employed.

Referring to Fig. 3, an alternating current generator 3 causes an alternating electric current to flow in the earth by means of two electrodes 1, 1' consisting of several square feet of wire netting or sheet metal buried a few feet beneath the earth's surface, which two electrodes are separated a distance of approximately 500 feet, although this distance is not essentially to be adhered to. It is generally desirable to embed the electrode in a mixture of salt and water to lower the resistance in the neighborhood of the electrode. An ammeter 4 is used to measure the current and a volt-meter 5 determines the potential drop across the electrodes. A frequency of 500 cycles is a good frequency for this work, as it produces an audible tone in a pair of telephone receivers and is not so high as to prevent it flowing deep into the earth. It is desirable to pass a current of from 5 to 20 amperes through the ground so that the electro-magnetic field will be sufficiently intense to permit observations to be made in the presence of disturbing fields due to telegraph and telephone lines, high tension power lines and extraneous noise. Frequency and current strength, however, may be varied at will. The currents will flow, as suggested by the curved dotted lines, going deep into the earth, as well as along the surface of the ground. These currents flowing in the earth will produce magnetic fields which can be observed over the surface of the earth. If we consider the current as flowing in normal homogeneous ground, the magnetic components of the electro-magnetic field at points along the midline 2—2 will lie in a vertical plane passing through this midline. At any point on this midline, the elementary components of this field will make various angles with the surface of the ground and have various phase relations with one another. We can speak of this field as having dispersion. The angular dispersion of these elementary fields will be small at points near the line drawn connecting the electrodes but will increase as we move outwards along the midline. In other words, the ratio of axes of the vibration ellipse is large near the line drawn connecting the electrodes but diminishes toward unity as we move outwards as the ellipse approaches a circle. When the ellipse is nearly a circle it is obviously not possible to determine the direction of its major axis accurately due to the approximately equal lengths of the major and minor axes. At positions off the midline 2—2, principles of symmetry cannot be applied and conditions are not so simple. For this reason, observations are generally to be confined to this midline. This is for ease of interpretation. However, this invention is not limited to observations made along the midline alone. The use of observations along the midline as facilitating interpretation is to be especially claimed within the scope of this invention.

Figure 4:
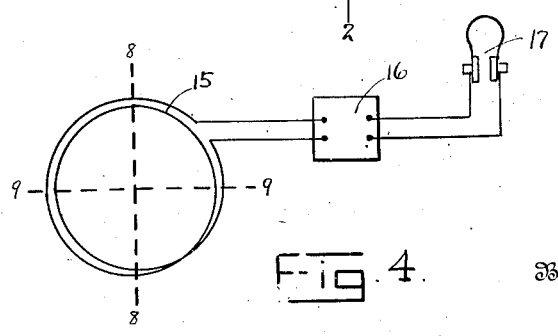
Fig. 4 is a schematic view of the loop circuit employed in obtaining the necessary data.

Observations may be made by means of apparatus shown schematically in Fig. 4. In this figure, 15 represents a loop consisting of a number of turns of wire (3000 turns of fine wire is satisfactory with a loop 10 or 12 inches in diameter, although the actual electrical design is not essentially important). Suffice it to say, the loop 15, vacuum tube amplifier 16 and telephone receivers 17 must constitute an electrical system capable of picking up, amplifying and converting into audible sound the energy of alternating electro-magnetic fields of the frequency employed in the work. This electrical system is familiar to those skilled in electrical arts.

The mechanical mounting of the loop, however, requires some consideration. The loop, Figs. 5 and 6, should be capable of rotation about the vertical axis 8 with a graduated scale 18 fixed to the loop mounting, and an index or pointer 19 fixed to the supporting standard should be provided, by means of which azimuth may be determined. A horizontal axis 9 must also be provided, and also a graduated circle 20, by means of which rotation of the loop about this axis may be measured. An index 21 is provided for convenience in reading vertical angles along the circle 20. A sight including a notched plate 22 and a pin 23 or a telescope or other sighting device should be fastened to the loop mounting in such a manner that the orientation of the loop with respect to directions on the earth's surface, may be measured—or a magnetic compass may be affixed to the loop mounting for the same purpose. The entire loop and its mounting should rest upon a sturdy stand (preferably a tripod) of convenient height for observation, and a means of leveling, spirit levels 25, 26 and leveling screws 27 should be provided so that the vertical axis 8 can be placed truly in the vertical. The amplifier 16 should be small and readily portable for convenience in carrying the equipment from station to station.

Figure 5:
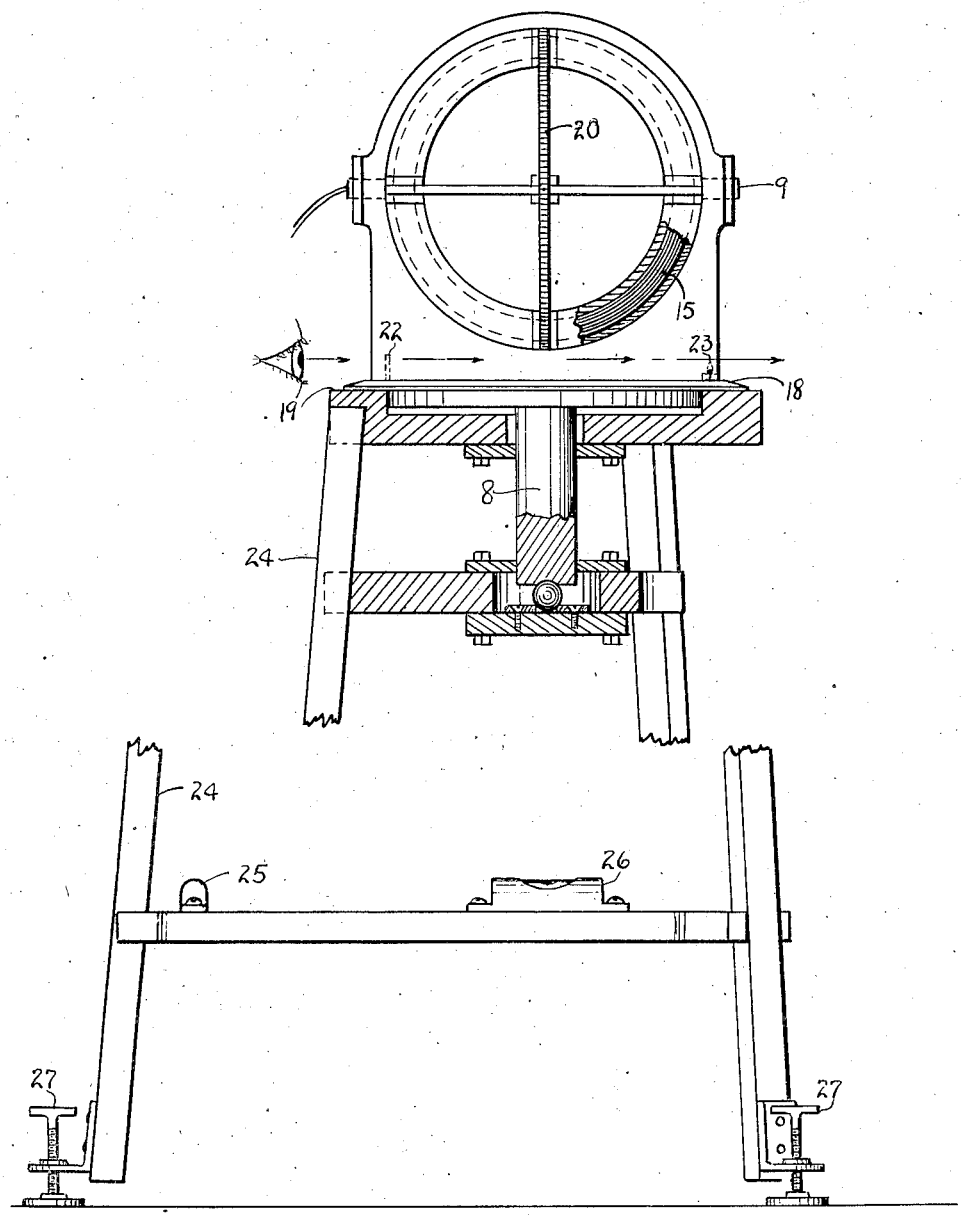
Fig. 5 is a broken side view of the apparatus employed with my loop, certain parts being broken away.
Figure 6:
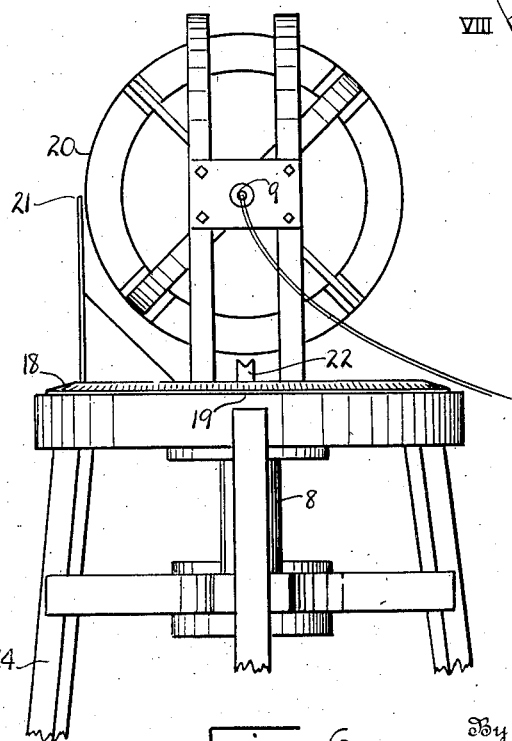
Fig. 6 is a broken view in side elevation of the upper end of the loop support and loop taken at right angles to the view seen in Fig. 5.

In Figs. 5 and 6 a complete loop with its mounting and tripod stand is shown, which serves admirably for making observations.

Figure 7:
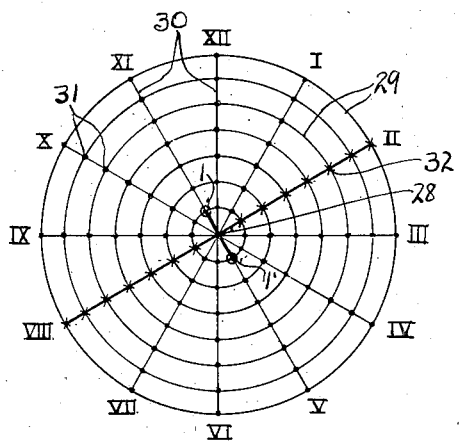
Fig. 7 is a map of a field as laid out for surveying.

In actual exploration work, a convenient procedure is as follows: In Fig. 7 is shown a plan view of the portion of ground to be explored. A stake 28 is placed at any selected point on the ground to be known as the center of the survey. Imagine circles 29 to be drawn with this stake as center, and with radii equal to integral multiples of say, 250 feet. There may be any number of these circles, but in actual practice, seven or eight are generally sufficient. Imagine further, that radii 30 are drawn, making angles of 30 degrees each with the next. These radii may be numbered according to the figures on a clock dial. All intersections 31 of the circles and radii are known as stations, and are the only points at which observations are customarily made. Station 5, line II, for instance, shown at 32 in the drawing, lies at a point 1250 feet from the center of the survey line II. Electrodes made in the manner already described are placed at Station 1 on each of the twelve lines. In making observations on lines II and VIII, the electrodes on lines XI and V are used. In making observations on lines IV and X electrodes on lines I and VII are used. Thus, the lines on which observations are being made, are always perpendicular to the line joining the electrodes. This is for reason of symmetry which simplify interpretation, as previously explained.

In making observations with the instrument, the instrument is set up over any particular station and leveled. The loop is then rotated about a vertical axis until the sights fall upon the central stake of the survey. The azimuth circle is then read. The loop is then rotated about both its vertical and its horizontal axes simultaneously, until the tone heard in the telephone receivers vanishes completely. A reading of the azimuth circle is again made, the difference in readings giving the horizontal angular direction or azimuth and the vertical circle is read to give the tilt. These two readings determine the plane tangent to the surface of magnetic fields.

It is distinctly to be understood that the words "azimuth" and "tilt" as here used are quantities defining the angular position in space of the tangent plane to the surface containing the elementary magnetic fields and not having reference to the direction of any of the elementary fields themselves.

Figure 8:
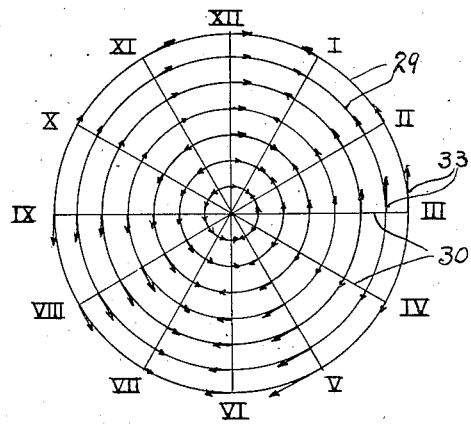
Fig. 8 is a similar view showing the manner in which that data is charted thereon.

A convenient method of plotting observations is to draw a series of concentric circles, as in Fig. 8, and radial lines corresponding to the actual survey drawn to some chosen scale. Intersections of circles and radii will represent the actual stations at which observations were made. Azimuth variation will, in general, be rather small. Therefore, generally, we plot only the tilt. The tilt is indicated on the chart in magnitude and direction by an arrow 33 drawn through the station in a direction perpendicular to the line on which the station lies, and in the direction that the bottom of the loop is moved from its position beneath the horizontal axis. A convenient scale is chosen and the tilt angles are represented by the arrows 33, of length proportional to these angles.

Thus our completed chart consists of numerous arrows which group themselves in such a manner as to give information relative to the disposition of buried disturbing masses. These plottings may be made directly upon a map of the region being explored, or upon a separate sheet, and the final chart will contain all such individual surveys which should overlap so as to leave no unexplored areas.

As large values of the tilt are to be associated with buried disturbing masses, these masses should lie beneath the general region of large effects. General deductions may be made as to the location of the buried masses simply by imagining the distortion of the current sheets in the earth necessary to produce the observed distortion of the surfaces of magnetic fields, and from this, getting an idea of the position of the buried masses to produce such a distortion of the current sheets. As an approximate estimate of the position of the disturbing mass, we may simply regard it as lying beneath the general region of large effects.

What I claim is:

1. A method of exploring for underground mineral deposits comprising, causing alternating electric currents to flow in the earth between two electrodes embedded in the surface thereof, determining at a series of points over the surface of the earth the angular position in space of the plane tangent to the surface containing the magnetic fields due to said currents, and co-ordinating the data so obtained.

2. A method of exploring for underground mineral deposits comprising, passing an alternating electric current through a selected portion of the earth between two electrodes buried in the surface thereof, determining at a series of points over the surface of the earth the angular position in space of the plane tangent to the surface containing the magnetic fields due to said currents, and co-ordinating the data so obtained.

3. A method of exploring for underground mineral deposits comprising, passing an alternating electric current through a selected portion of the earth, determining distortions of the surfaces formed by the dispersed magnetic fields due to said currents, and co-ordinating the data so obtained.

4. A method of exploring for underground mineral deposits, comprising fixing two spaced electrodes in the earth, passing an alternating electric current from one electrode to the other, observing at a series of points above a line on the earth's surface perpendicular to a line connecting said electrodes, the distortions of the surfaces formed by the dispersed magnetic fields due to said currents, and co-ordinating the data thus obtained.

5. A method of exploring for underground mineral deposits comprising, fixing two spaced electrodes in the earth, passing an alternating electric current from one electrode to the other, making a series of observations above a line on the earth's surface perpendicular to the line joining said electrodes and midway between them, and co-ordinating the data thus obtained to determine the presence and location of said mineral deposits.

6. A method of exploring for sub-surface deposits of minerals, comprising marking off on a portion of the earth's surface a series of spaced concentric circles, locating a set of spaced diameters in said circles, burying a pair of electrodes along a diameter at points spaced equally from the center, causing an alternating electric current to pass between said electrodes, observing the azimuth and tilt of magnetic surfaces along a diameter at right angles to the diameter containing said electrodes, moving the electrodes from one to another of the diameters until the set of diameters has been covered, and plotting the data thus obtained.

7. A method of exploring for sub-surface deposits of minerals, comprising marking off on a portion of the earth's surface a series of spaced concentric circles, locating a plurality of spaced diameters in said circles, burying a pair of electrodes along a diameter at points spaced equally from the center, causing an alternating current to pass between said electrodes, determining the angular positions of the planes tangent to the surfaces formed by the magnetic fields set up by the resulting current sheets in the earth along a diameter at right angles to the diameter containing said electrodes, moving the electrodes from one to another of the diameters until the set of diameters has been covered, and plotting the data thus obtained.

8. A method of exploring for sub-surface deposits of minerals, comprising marking off on a portion of the earth's surface a series of spaced concentric circles, locating a set of spaced diameters in said circles, each diameter having another perpendicular thereto burying a pair of electrodes along a diameter at points spaced equally from the center, causing an alternating electric current to pass between said electrodes, observing the azimuth and tilting of planes containing the vibration ellipse of the magnetic field along a diameter at right angles to the diameter containing said electrodes, varying the positions of said electrodes from one diameter to another and plotting the data thus obtained.

9. A method of exploring for sub-surface mineral deposits comprising burying two spaced electrodes beneath the surface of the ground, passing an alternating electric current between said electrodes, and thus forming a series of resulting current sheets, making observations along a midline between said electrodes, charting the surfaces formed in space by the alternating magnetic fields due to said current sheets, and noting the distortions of said surfaces from the normal.

10. A method of exploring for underground mineral deposits comprising fixing two spaced electrodes beneath the surface of the earth, passing an alternating electric current through the earth by means of these electrodes, determining at a series of points over the surface of the earth the angular position in space of the plane of the elliptical magnetic field due to said alternating electric currents and correlating the data thus obtained.

11. A method of exploring for underground mineral deposits comprising the steps of setting up a flow of alternating electric currents between two electrodes placed in the earth, determining the plane tangent to the surface containing the vibration ellipse of the magnetic field set up by these currents, and determining the deviation of this plane from a similar plane which would result in normal earth.

12. A method of sub-surface prospecting consisting in passing an electric current through the earth between two electrodes embedded in the surface thereof and determining at a plurality of systematically arranged points the location of the plane of the vibration ellipse of the magnetic flux produced by this current.

13. A method of exploring for underground mineral deposits comprising, fixing two spaced electrodes in the earth passing an alternating electric current from one electrode to the other, making a series of observations of the plane of the magnetic field produced by such currents above the line on the earth's surface perpendicular to the line joining said electrodes and midway between them, and co-ordinating the data thus obtained to determine the presence and location of said mineral deposits.

In testimony whereof I hereunto affix my signature this 24th day of January, A. D. 1928.

NORMAN H. RICKER.